(12) United States Patent
Hosseini et al.

(10) Patent No.: US 11,258,572 B2
(45) Date of Patent: Feb. 22, 2022

(54) TRANSPORT BLOCK SIZE FOR CHANNELS WITH SHORTENED TRANSMISSION TIME INTERVAL

(71) Applicant: QUALCOMM Incorporated, San Diego, CA (US)

(72) Inventors: Seyedkianoush Hosseini, San Diego, CA (US); Amir Farajidana, Sunnyvale, CA (US); Ahmed Omar Desouky Ali, San Jose, CA (US); Thiagarajan Sivanadyan, Arvada, CO (US); Wenshu Zhang, San Diego, CA (US); Pengkai Zhao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/270,546

(22) Filed: Feb. 7, 2019

(65) Prior Publication Data
US 2019/0253229 A1 Aug. 15, 2019

Related U.S. Application Data

(60) Provisional application No. 62/631,392, filed on Feb. 15, 2018.

(51) Int. Cl.
*H04L 5/00* (2006.01)
*H04W 72/04* (2009.01)

(52) U.S. Cl.
CPC .......... *H04L 5/0094* (2013.01); *H04L 5/0007* (2013.01); *H04W 72/04* (2013.01); *H04L 5/0044* (2013.01)

(58) Field of Classification Search
CPC ... H04L 1/0003; H04L 1/0041; H04L 1/0063; H04L 5/0044; H04L 5/0007; H04L 5/0094; H04W 72/005–0473
See application file for complete search history.

(56) References Cited

U.S. PATENT DOCUMENTS

2017/0257199 A1* 9/2017 Sahlin ............... H04W 72/0446
2018/0198570 A1* 7/2018 Astely ................... H04L 1/1896
(Continued)

FOREIGN PATENT DOCUMENTS

WO 2017166294 A1 10/2017

OTHER PUBLICATIONS

LTE; Evolved Universal Terrestrial Radio Access (E-UTRA); Physical layer procedures (3GPP TS 36.213 version 13.0.0 Release 13), May 2016, pp. 1-327 (Year: 2016).*

(Continued)

*Primary Examiner* — Michael Thier
*Assistant Examiner* — Prince A Mensah
(74) *Attorney, Agent, or Firm* — QUALCOMM Incorporated

(57) ABSTRACT

Systems, apparatuses, and methods for computing transport block size (TBS) for channels with shortened transmission time interval (sTTI). An initial size may be determined based on one or more TBS tables. The initial size may be scaled by a factor associated with an sTTI channel. A TBS table is selected based on the one or more TBS tables. The scaled size may be rounded based on the selected TBS table to generate a TBS for the sTTI channel.

19 Claims, 7 Drawing Sheets

(56) References Cited

U.S. PATENT DOCUMENTS

2019/0173615 A1* 6/2019 Andersson ............ H04L 1/0041
2019/0190660 A1* 6/2019 Liu ...................... H04W 76/27

OTHER PUBLICATIONS

Motorola Mobility: Introduction of shortened processing time and shortened TTI into 36.213, release Dec. 15, 2017, pp. 50-325 (Year: 2017).*

Ericsson: "TBS Scaling for Short TTI", 3GPP Draft; R1-1717175 TBS Scaling for Short TTI, 3rd Generation Partnership Project (3GPP), Mobile Competence Centre, 650, Route Des Lucioles ; F-06921 Sophia-Antipolis Cedex, France, vol. RAN WG1, No. Prague, Czech Republic; Oct. 9, 2017-Oct. 13, 2017, Oct. 8, 2017 (Oct. 8, 2017), XP051340365, Retrieved from the Internet: URL: http://www.3gpp.org/ftp/Meetings_3GPP_SYNC/RAN1/Docs/ [retrieved on Oct. 8, 2017].

International Search Report and Written Opinion—PCT/US2019/017560—ISA/EPO—dated Apr. 11, 2019.

Motorola Mobility: "Introduction of Shortened Processing Time and Shortened TTI into 36.213, s06-s09", 3GPP Draft; 36213CRO99R1-(REL-15)_R1-1721329, 3rd Generation Partnetship Project (3GPP), Mobile Competence Centre, 650, Route Des Lucioles ; F-06921 Sophia-Antipolis Cedex, France, vol. RAN WG1, No. Reno, USA; Nov. 27, 2017-Dec. 1, 2017, Dec. 17, 2017 (Dec. 17, 2017), XP051364652, Retrieved from the Internet: URL: http://www.3gpp.org/ftp/Meetings_3GPP_SYNC/RAN/Docs/ [retrieved on Dec. 17, 2017], Section 7.1.7, pp. 82-325.

* cited by examiner

TRANSPORT BLOCK SIZE FOR CHANNELS WITH SHORTENED TRANSMISSION TIME INTERVAL

PRIORITY CLAIM AND CROSS REFERENCE TO RELATED APPLICATIONS

This application claims the benefit of priority of U.S. Provisional Application No. 62/631,392, entitled "Transport Block Size for Channels with Shortened Transmission Time Interval" and filed on Feb. 15, 2018. The above identified application/document is expressly incorporated by reference in entirety herein as part of the disclosure of this application.

BACKGROUND

This disclosure relates generally to wireless communication, and more specifically, to transport block size for channels with shortened transmission time interval (sTTI).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some Long Term Evolution (LTE) or New Radio (NR) deployments, base stations and/or UEs may transmit a data packet during a defined time duration, generally referred to as transmission time interval (TTI). Legacy LTE systems (e.g., LTE Release 8) generally use 1 millisecond (a duration of a subframe) as TTI. Later LTE releases introduce shortened TTI (sTTI) to support services that provide low latency for wireless transmissions. An sTTI has shorter duration in time relative to the legacy (or non-shorten) TTI. Correspondingly, the amount of available resources for an sTTI transmission may be smaller than that of the legacy TTI, and hence, a transport block (TB) for an sTTI channel may have a smaller transport block size (TBS) relative to a legacy TTI channel.

SUMMARY

Systems, apparatuses, and methods are disclosed for transport block size (TBS) for shortened TTI (sTTI) channels. An initial size may be determined based on one or more TBS tables, such as a baseline table, or a translation table that maps a baseline size from the baseline table to a TBS value for a transport block mapped to more than one layer. The initial size may be scaled by a factor associated with the sTTI channel. A TBS table may be selected based on the one or more TBS tables. The scaled size may be rounded based on the selected TBS table to generate a TBS for the sTTI channel.

In an aspect, a method of computing TBS for an sTTI channel is provided. The method may be performed by a UE or a base station. An initial size may be determined using at least a baseline table. The initial size may be scaled by a factor associated with the sTTI channel. Furthermore, a table may be selected from either the baseline table, or a translation table, or a combination thereof. In addition, the scaled size may be rounded to a TBS value of the selected table.

In another aspect, an apparatus of computing TBS for an sTTI channel may be provided. The apparatus may include a memory and a processor coupled to the memory. The processor may be configured to determine an initial size using at least a baseline table. The processor may also be configured to scale the initial size by a factor associated with the sTTI channel. Furthermore, the processor may be configured to select a table from either the baseline table, or a translation table, or a combination thereof. In addition, the processor may be configured to round the scaled size to a TBS value of the selected table.

In yet another aspect, an apparatus of computing TBS for an sTTI channel may be provided. The apparatus may include means for determining an initial size using at least a baseline table. The apparatus may also include means for scaling the initial size by a factor associated with the sTTI channel. Furthermore, the apparatus may include means for selecting a table from either the baseline table, or a translation table, or a combination thereof. In addition, the apparatus may include means for rounding the scaled size to a TBS value of the selected table.

In yet another aspect, a non-transitory computer readable medium of computing TBS for an sTTI channel is provided. The non-transitory computer-readable medium may contain instructions stored thereon which may include codes executable for an apparatus to perform determining an initial size using at least a baseline table. The instructions may also include codes for scaling the initial size by a factor associated with the sTTI channel. Furthermore, the instructions may include codes for selecting a table from either the baseline table, or a translation table, or a combination. In addition, the instructions may include codes for rounding the scaled size to a TBS value of the selected table.

In various aspects, the translation table maps a baseline size from the baseline table to a TBS for a transport block mapped to multiple layers.

In various aspects, a union of the baseline table and a translation table may be selected based on a number of layers to which a transport block of the sTTI channel is mapped In various aspects, the baseline table may be selected if the scaled size is smaller than a threshold. In some cases, the baseline or the translation may be selected depending on a number of layers to which a transport block of the sTTI channel is mapped, if the scaled size is greater than the threshold.

In various aspects, a set of TBS values of the selected table is determined for rounding the scaled size. The set may contain all the TBS values of the selected table. The scaled size may be rounded to a closest value in the set. If two different values of the set are equally closest to the scaled size, the scaled size may be rounded to the larger one of the two values.

Various features and advantages of this disclosure are described in further details below. Other features will be apparent from the description, drawings, and/or the claims.

BRIEF DESCRIPTION OF THE DRAWINGS

Illustrative and non-limiting drawings are provided to aid in the description of various aspects and implementations. Unless specified otherwise, like reference symbols indicate like elements.

DETAILED DESCRIPTION

TBS for legacy TTI channels may be computed using various TBS tables, such as a baseline and a translation table, that provide a TBS value for a transport block mapped to one or more layers. These tables may be reused to compute TBS for an sTTI channel. An initial size corresponding to a non-shorten channel may be determined based on these TBS tables. The initial size may be scaled by a factor associated with the sTTI channel. The factor may represent a proportional reduction in the amount of available resources afforded by the sTTI channel, relative to a corresponding legacy channel. A TBS table may be selected based on various TBS tables. For example, a translation TBS table may be avoided, in favor of a baseline table, if the scaled size is smaller than a threshold. For another example, a combined table from a baseline table and a translation table may be selected based on a number of layers to which a transport block of the sTTI channel is mapped. The TBS of the sTTI channel may be determined by rounding the scaled size to a TBS value of the selected table.

Aspects of the disclosure introduced above are described below in the context of a wireless communications system. Examples of TBS computation for legacy TTI and sTTI channels are then described. Aspects of the disclosure are further illustrated by and described with reference to various apparatus diagrams, system diagrams, and flowcharts.

Figure 1:
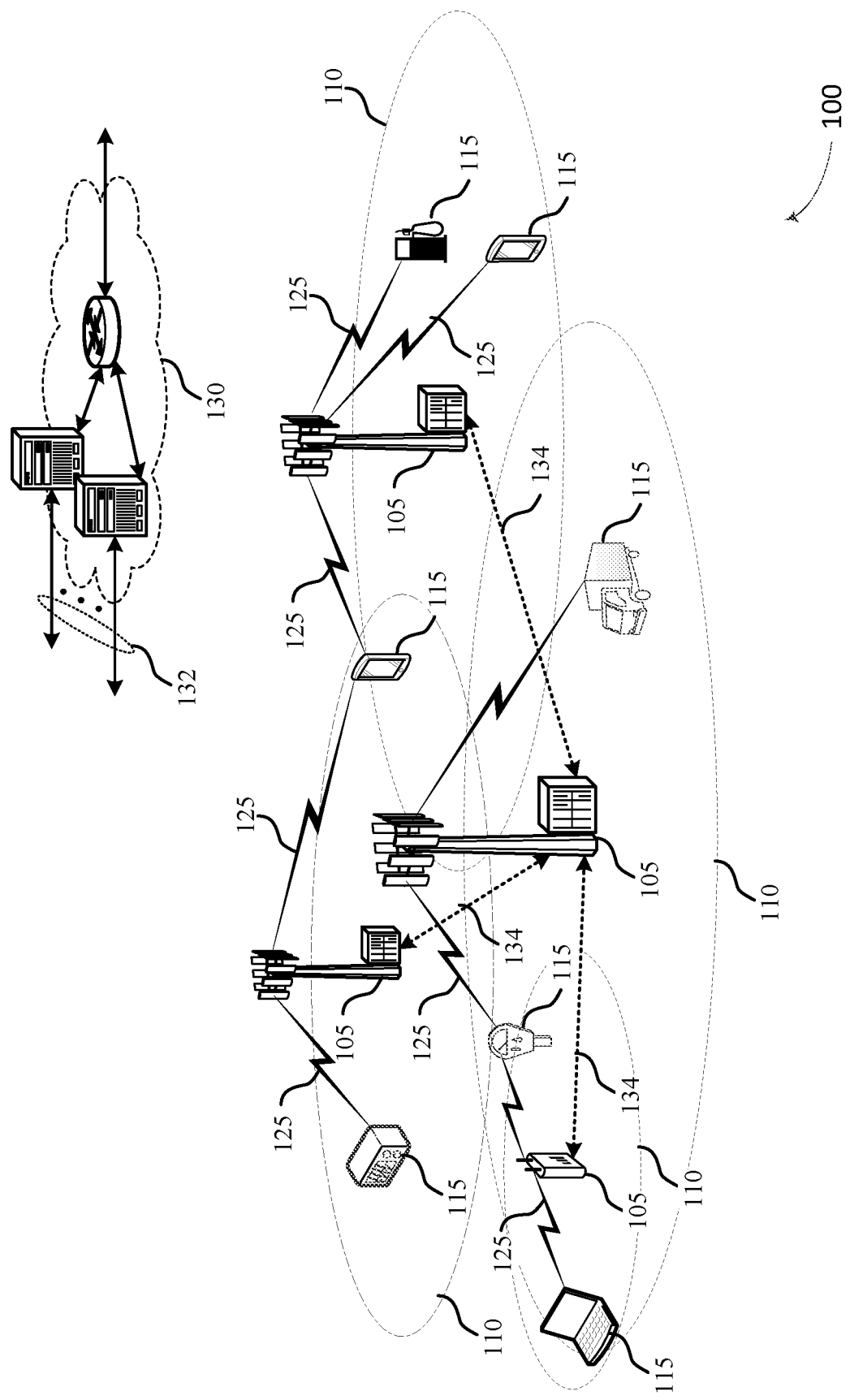
FIG. 1 illustrates an example of a wireless communications system.

FIG. 1 illustrate an example of wireless communications system 100. The wireless communications system 100 includes base stations 105, UEs 115, and a core network 130. In some examples, the wireless communications system 100 may be an LTE, LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

In an example, a UE 115 and a base station 105 may support communications via sTTI channels as well as legacy TTI channels. A UE 115 and a base station 105 may compute TBS for a transport block for sTTI channels by leveraging legacy TBS computation mechanisms.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI duration of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). An mmW (millimeter wave) receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a network device, base station 105, or core network 130 supporting radio bearers for user plane data. At the Physical (PHY) layer, transport channels may be mapped to physical channels.

Time intervals in LTE or NR may be expressed in multiples of a basic time unit (which may be a sampling period of $Ts=1/30,720,000$ seconds). Time resources may be organized according to radio frames of length of 10 ms ($Tf=307200$ Ts), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases, the subframe may be the smallest scheduling unit, also known as a TTI duration. In other cases, a TTI duration may be shorter than a subframe or may be dynamically selected (e.g., in short TTI duration bursts or in component carriers using short TTI durations (for example, sTTIs)).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

For illustrative purposes, the following examples and figures may be described with reference to UE 115 and base station 105 of FIG. 1; however, other types of UEs or base stations may be used in same or other examples without limiting the scope of the present disclosure.

Figure 2:
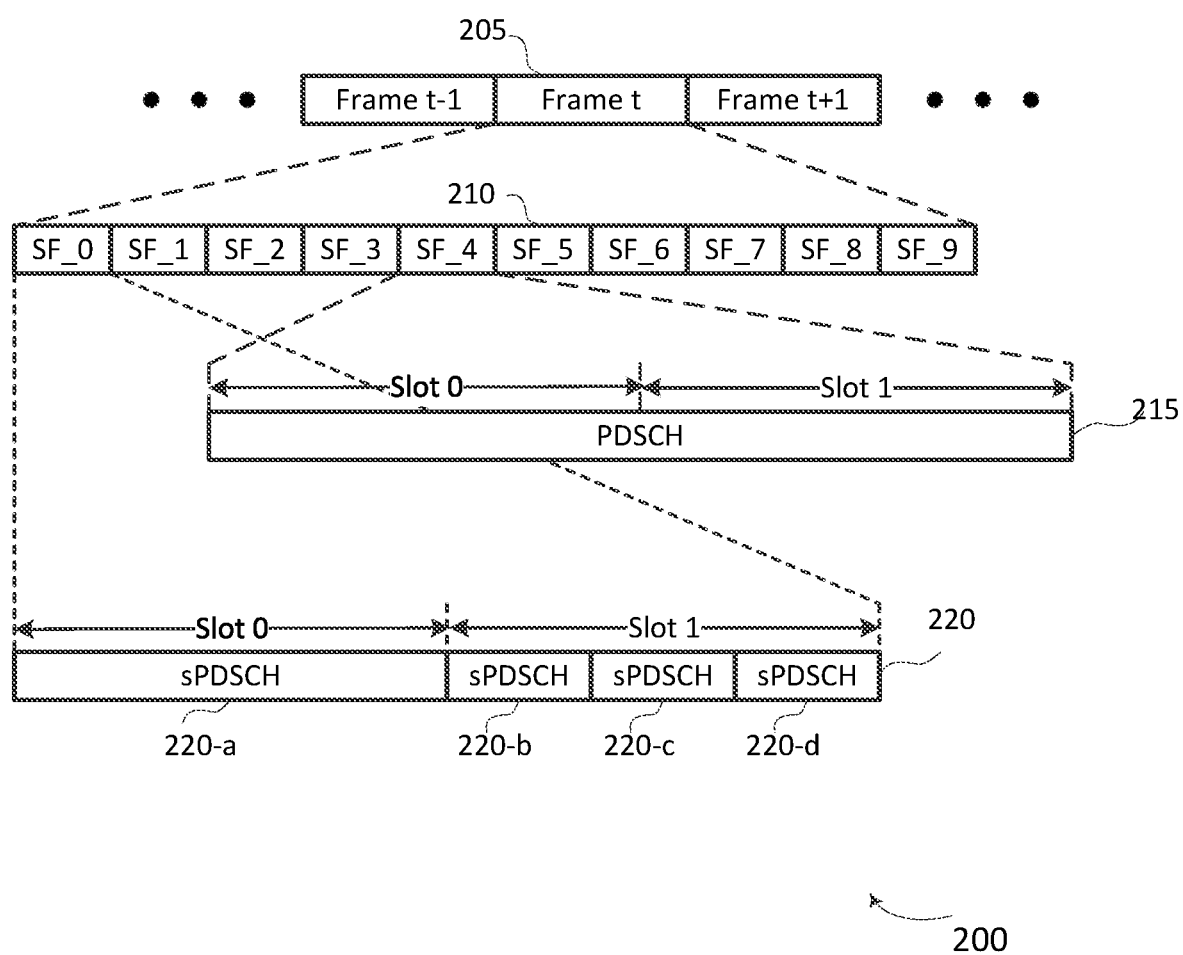
FIG. 2 illustrates an example of a frame structure containing shortened transmission time intervals.

FIG. 2 illustrates an example of a frame structure 200 containing shortened transmission time intervals. A transmission timeline may be partitioned into units referred to herein as (radio) frames. Depicted are frames t−1, t, and t+1. Each frame 205 may have a defined duration (e.g., 10 milliseconds (ms)) and may be partitioned into a defined number of subframes 210 having corresponding indices (e.g., 10 subframes with indices of 0 through 9). A subframe 210 may be used for uplink communication or downlink communication. In uplink communication, a UE 115 transmits to a base station 105. In downlink communication, a base station 105 communicates to a UE 115. Each subframe 210 may include two slots and each slot may include L symbol periods, e.g., L=7 symbol periods for a normal cyclic prefix or L=6 symbol periods for an extended cyclic prefix. The 2L symbol periods in each subframe may be assigned indices of 0 through 2L−1.

The available time and frequency resources of each subframe 210 may be partitioned into resource blocks (RBs). Each resource block may cover N subcarriers (e.g., 12 subcarriers) in one slot. Each subcarrier may occupy a certain frequency bandwidth (e.g., 15 kiloHertz (kHz)). One or more resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period.

A TTI 215 may be referred to as a duration in time of a subframe 210 (e.g., 1 ms). An sTTI 220 (e.g., 220-a to 220-d) may have a duration that is less than the duration of TTI 215. In an example, an sTTI 220 may include one or more symbols, may correspond to a duration of a single slot, or the like. An sTTI may be referred to as slot TTI for duration equal to a slot, and sub-slot TTI for duration less than a slot. In the depicted example, sTTI 220-a may have slot sTTI, occupying a duration of one slot, and sTTI 220-b, 220-c, and 220-d, each with sub-slot sTTI, may collectively occupy a duration of one slot.

A channel transmitted within a TTI 215 may be referred to as non-shortened TTI (or legacy) channel, and one within an sTTI 220 an sTTI (or shortened) channel. In some examples, a TTI 215 may transport physical downlink shared channel (PDSCH) in the downlink and physical uplink shared channel (PUSCH) in the uplink. An sTTI 220 may transport shortened PDSCH (sPDSCH) in the downlink and shortened PUSCH (sPUSCH) in the uplink.

Figure 3:
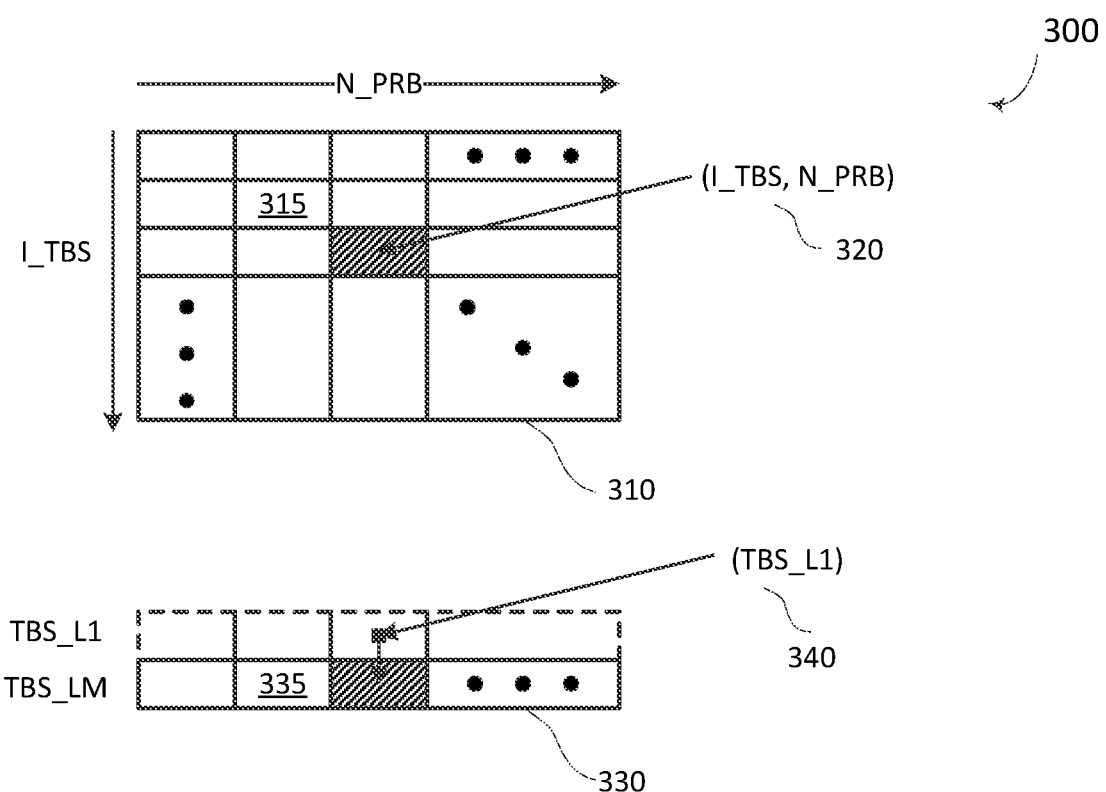
FIG. 3 illustrates various examples of TBS tables for TBS computation of non-shortened TTI channels.

FIG. 3 illustrates various examples of TBS tables 300 for TBS computation of non-shortened TTI channels. A channel may transport data in one or more transport blocks. A transport block may contain one or more units of data. The number of the transported units is referred to as TBS of the transport block. An TBS may be expressed in units of bits, bytes, or the like; for example, TBS is defined in bits for LTE systems. TBS may vary with the amount of available communication resources (including time, frequency, and/or spatial dimension) for a transport block. A ratio of TBS to the amount of available communication resources may provide a measure of efficiency in resource utilization. The larger the TBS for a given amount of resources, the higher the resource utilization but the less the redundancy added to protect against communication errors. Different TBS values may be selected depending on channel conditions, available resources, or other considerations.

A transport block may be mapped to one or more layers over which data of the transport block can be sent. In some cases, multiple layers can be created in spatial dimension using multiple antennas. For example, a 2-by-2 MIMO system may provide two spatial layers on the same time and frequency resources. A transport block may occupy the two layers (i.e., one mapped to two layers), or each of two transport blocks may separately occupy only one of the two layers (i.e., each mapped to one layer).

A baseline table 310 may contain one or more TBS values as entries 315. The entries 315 may be indexed by an TBS index (e.g., I_TBS) and a PRB index (e.g., N_PRB representing the number of physical resource blocks (PRBs) for a transport block). For the same PRB index, different TBS indices may point to different TBS values. In some cases, the same TBS index may provide for approximately the same level of resource utilization as PRB index varies.

As an example of the baseline table 310, the I_TBS may range from 0 to 26, and N_PRB may range from 1 to 110. Thus, the baseline table 310 has 27-by-110 entries 315. The TBS values of the entries 315 may generally increase along with I_TBS or N_PRB. In some cases, the TBS values are byte-aligned, that is, being multiples of eight (1 byte=8 bits).

A baseline table 310 may be used to compute TBS for a transport block mapped to one layer. As illustrated by a look-up operation 320, the TBS of the transport block is given by the corresponding entry 315 in the baseline table 310 indexed by the (I_TBS, N_PRB) pair, wherein the transport block is assigned I_TBS and has N_PRB of RBs.

The baseline table 310 may also be used to compute TBS for a transport block mapped to multiple (M) layers (M>1). The number of available resources may generally increase proportionally along with the number of layers. For a given TBS index, the number of available resource may also generally increase proportionally along with the PRB index. In some scenarios, the baseline table 310 may accommodate the increased layer without the use of an additional table. Consider a transport block mapped to M layer has assigned an I_TBS and has N_PRB number of PRBs. If N_PRB multiplied by M does not exceed the maximum PRB index of the baseline table 310 (e.g., 110), the TBS of the transport block may be given by the TBS value of the baseline table 310 indexed by (I_TBS, M times N_PRB).

A translation table 330 may be used in conjunction with the baseline table 310 to compute TBS when the baseline table 310 may not able to accommodate the M-fold increased value of N_PRB. For example, if N_PRB equals to 60 and M equals to 2, M times N_PRB, being 120, may exceed the range of PRB indices of the baseline table (e.g., 1 to 110). In such a case, the TBS computation first uses the baseline table 310 to generate a baseline size (denoted by TBS_L1) as if the transport block were mapped to one layer instead of multiple layers. For example, TBS_L1 may be given by the corresponding entry 315 of the baseline table 310 indexed by the TBS index (I_TBS) and PRB index (N_PRB) of the transport block.

The translation table 330 then maps the baseline size (TBS_L1) from the baseline table 310 to a TBS value (denoted by TBS_LM) for the transport block mapped to M layers. The translation table 330 may contain one or more TBS values as entries 335, and the entries 335 may be indexed by TBS_L1 values. As illustrated by a translation operation 340, after TBS_L1 is computed, the TBS for the transport block may be given by the corresponding TBS_LM value indexed by the TBS_L1 in the translation table 330.

The baseline table 310 and the translation table 330 together provide a TBS computation mechanism for non-shortened or legacy channels. Legacy systems and implementations may be designed and/or optimized based on these tables. For example, turbo codes interleavers may have fixed sizes corresponding to the TBS values of these tables. It may be beneficial to reuse the baseline table 310 and the translation table 330 to support TBS computation the sTTI channels.

As illustrative examples in the context of LTE systems, the baseline table 310 may be Table 7.1.7.2.1-1, and the translation table 330 may be Table 7.1.7.2.2-1 for two layer (or Table 7.1.7.2.4-1 for three layers, or Table 7.1.7.2.5-1 for four layers), defined in the 3rd Generation Partnership Project (3GPP) Technical Specification series 36.213 (LTE Release 8 or onwards).

Figure 4:
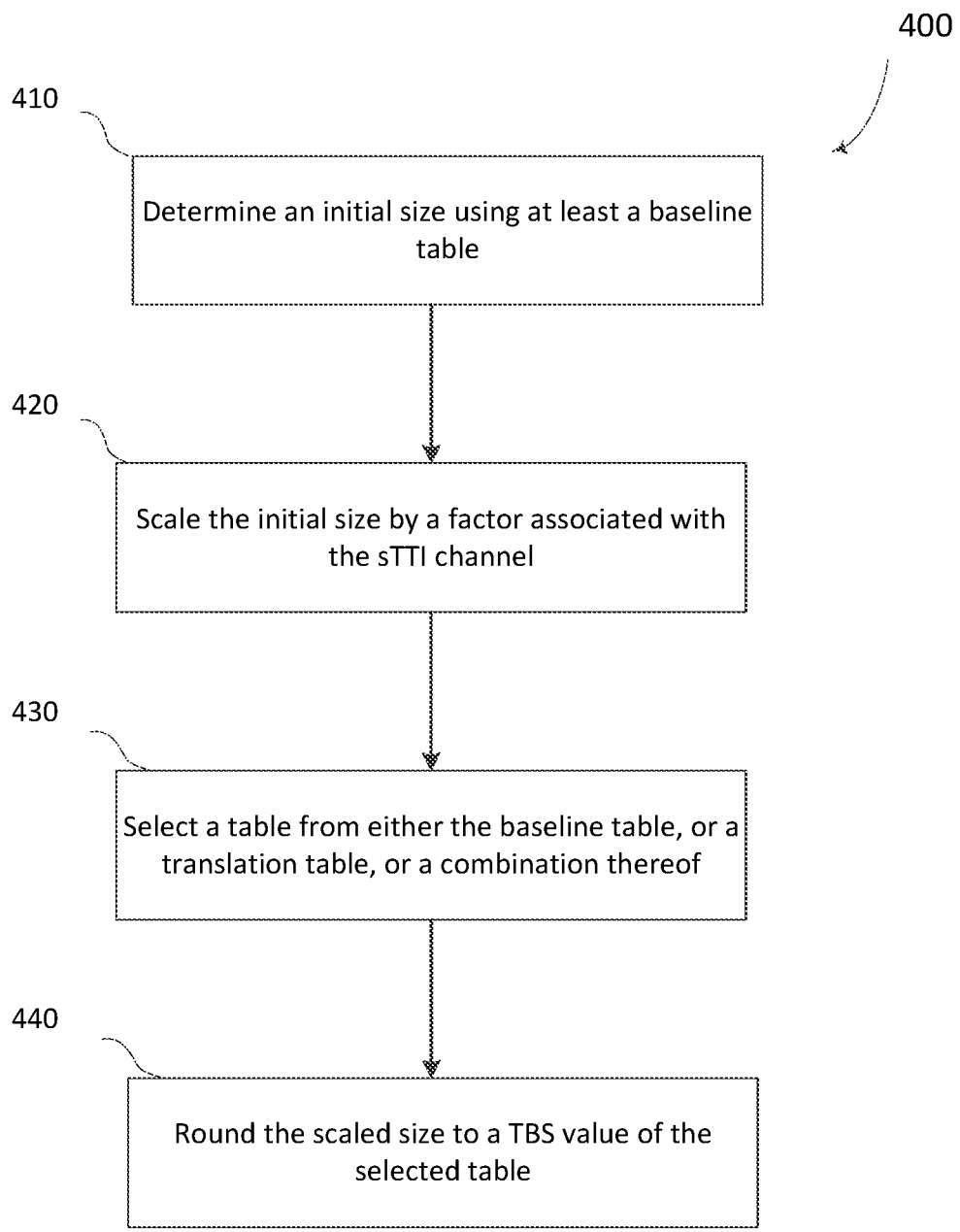
FIG. 4 illustrates an example of a method of computing TBS for sTTI channels.

FIG. 4 illustrates an example of a method 400 of computing TBS for sTTI channels. The method 400 may adapt a baseline table and a translation table originally for legacy channels to sTTI channels which may have relatively fewer number of resources (e.g., symbols in time duration). A UE 115, a base station 105, or a component therein may perform the method 400 to determine TBS of a transport block mapped to one or more layers for an sTTI channel (e.g., sPDSCH or sPUSCH). The TBS computation may be implemented in a similar way at both a transmitter and a receiver to process a legacy or sTTI channel between the transmitter and the receiver.

At block 410, an initial size may be determined using at least a baseline table. In addition to the baseline table, the TBS computation for legacy channels may also use a translation table, e.g., such as discussed above with reference to FIG. 3. The baseline table and the translation table may be examples of the baseline table 310 and the translation table 330 described with reference to FIG. 3. In some examples, the baseline table alone may provide TBS values for a transport block mapped to one layer, or in some scenarios, for a transport block mapped to multiple layers. In other scenarios, the translation table may be used in conjunction with the baseline table to provide TBS values for a transport block mapped to more than one layers. The translation table may map a baseline size from the baseline table to a TBS for a transport block mapped to multiple layers. The baseline table and the translation table may contain all the valid TBS values that a transport block can use.

The initial size may be determined as if the transport block were for a corresponding non-shortened channel for the same TBS index and channel bandwidth (e.g., as measured by the number of allocated PRBs) but with longer transmission duration in time. However, the shorter transmission time interval of the sTTI channel may provide a fewer number of symbols for data transmission. For example, while a legacy PDSCH may have thirteen or more data (OFDM) symbols in a subframe, an sPDSCH may not have more than seven symbols for slot sTTI or three symbols for sub-slot sTTI.

At block 420, the initial size may be scaled by a factor associated with the sTTI channel. The scaling factor may be chosen based on the length of an sTTI relative to non-shorten TTI. For example, the scaling factors for downlink channels may be ½ for slot sTTI channels or ⅙ for sub-slot sTTI channels; the scaling factors for uplink channels may be ½ for slot sTTI channels, ⅙ for sub-slot sTTI channels, or 1/12 for sub-slot sTTI channels containing only one data symbol.

After scaling, the scaled size could be a non-integer value, and even if the scaled size is an integer value, it may not match exactly with any TBS value or entry of the baseline table or the translation table. It may be beneficial to round the scaled size to a suitable entry in the baseline table or the translation table, such that a transport block of the newer sTTI channel can reuse an existing TBS value supported by a legacy system.

In one example, a baseline table is selected if the transport block is mapped to one layer, but if the transport block is mapped to more than one (M>1) layer, a translation table corresponding to M layers is selected irrespective of the value of the scaled size. However, some translation table may have a relatively large minimum TBS value among its table entries, and the scaled size may be substantially smaller than the minimum TBS value. In this case, choosing a TBS value from the translation table may be problematic. For example, the previously referred LTE Table 7.1.7.2.2-1, Table 7.1.7.2.4-1, Table 7.1.7.2.5-1 all have minimum value of 3112 as a (translated) TBS value.

Consider a 2-layer (M=2) sub-slot sPDSCH with 50 RBs (N_PRB=50) and TBS index of 26A (I_TBS=26A). For N_PRB smaller than or equal to 55 (assuming the PRB index of the baseline table ranges from 1 to 110), the TBS of the 2-layer for non-shortened channels is the (I_TBS=26A, 2N_PRB=100) entry of the baseline table, which may have a TBS value of 66592. Thus, the initial size is 66592. After scaling with ⅙ (the scaling factor associated with the sub-slot sPDSCH), the scaled size is 11098.66 (i.e., 66592/6). A TBS value of 11064 from the translation table may appear to be a relatively close approximation of the scaled size. (The TBS value of 11064 may originally be a TBS_L2 entry indexed by TBS_L1 value of 5544 in the translation table.)

Now consider a 2-layer (M=2) sub-slot sPDSCH with 12 RBs (N_PRB=12) and TBS index of 4 (I_TBS=4). The initial size is given by the (I_TBS=4, 2N_PRB=2×12=24) entry of the baseline table, which may have a TBS value of 1736. Accordingly, the scaled size is 289.3 (1736/6). However, the translation table may have a minimum TBS value of 3112, which may be substantially larger than the scaled size (as in this case, 3112 is more than double of 289.3). A sub-slot sTTI with 12 RBs may carry at most 576 coded bits for data transmission. Thus, if the TBS of the transport block were chosen to be 3112 or any other TBS value in the translation table, the resulting transmission could have a coding rate greater than one, that is, there are more bits to transmit than the channel resources can support.

At block 430, a table may be selected from either the baseline table, or a translation table, or a combination thereof. In some cases, considering the value of the scaled size in table selection can avoid the problem discussed above. The scaled size may be compared to a threshold. The threshold may depend on the TBS values of the translation table, for example, being the smallest TBS value of the translation table (e.g., 3112 in the preceding examples).

In one aspect, the baseline table may be selected if the scaled size is smaller than the threshold. In such case, TBS computation may avoid using the translation table for some TBS and PRB index combinations that may produce small scaled sizes relative to the translation table. In some implementations, if the scaled size is greater than or equal to the threshold, the baseline table may be selected for a transport block mapped to one layer, or the translation table otherwise.

In another aspect, if the scaled size is greater than the threshold, the baseline table or a translation table may be selected depending on a number of layers to which the transport block of the sTTI channel is mapped. For example, if the scaled size is greater than the threshold, then the baseline table is selected if the transport block is mapped to one layer or a translation table associated with M layers is selected if the transport block is mapped to M layers (M>1).

In yet another aspect, the translation table may be selected if the scaled size is greater than the threshold and if the translation table is used to determine the initial size. In some cases, the TBS values of the baseline table may have finer granularity than the TBS values of the translation table. The finer granularity in TBS values of the selected table may provide closer approximation of the scaled size. An implementation may prefer the baseline table, especially if the translation table is not used to determine the initial size, such as when the baseline table may accommodate the M-fold increase in PRB index for a transport block mapped to M layer.

In some designs, a combination of the baseline table and one or more translation tables may be selected. In particular, a union of the baseline table and a translation table may be selected based on a number of layers to which a transport block of the sTTI channel is mapped. In one example, a combined table (e.g., a union of tables) may contain some or all the TBS values of the baseline table (e.g., LTE Table 7.1.7.2.1-1) and all the translation tables for the various multiple layers (e.g., LTE Table 7.1.7.2.2-1, Table 7.1.7.2.4-1, and Table 7.1.7.2.5-1 for two, three, and four layers respectively) supported by the system, regardless how many layers the transport block is mapped to. In another example (where the selection depends on how many layers to which a transport block is mapped), a combined table (e.g., a union of tables) may contain some or all the TBS values of the baseline table and a translation table for M layers when the transport block is mapped to M layers. For instance, if the transport block is mapped to three layers, the corresponding Table 7.1.7.2.4-1 may be combined with Table 7.1.7.2.1-1. In general, a combined table may be generated from a baseline table and a particular translation table associated with the number of layers to which a transport block is mapped.

As an illustrative example in the LTE context, TBS for downlink sTTI channels may be computed based on LTE legacy TBS tables, including Table 7.1.2.1.1 (baseline table), Table 7.1.7.2.2-1 (translation table for two layers), Table 7.1.7.2.4-1 (translation table for three layers), and Table 7.1.7.2.5-1 (translation table for four layers). In this example, a scaled transport block size for sTTI channels may be quantized or rounded to entries of a combined table depending on the number of layers. A union of a baseline table (e.g., Table 7.1.7.2.1-1) and a translation table (e.g., Table 7.1.7.2.2-1 for two layers, Table 7.1.7.2.4-1 for three layers, or Table 7.1.7.2.5-1 for four layer) constitutes the "combined table" for a respective number of layers. More specifically, for a downlink sTTI channel (e.g., scheduled by DCI format 7-1A/7-1B/7-1C/7-1D/7-1E/7-1F/7-1G), an initial size for a transport block (e.g., as determined using baseline table or additionally a translation table when the transport block is mapped to more than one spatial layer) is scaled by a scaling factor α (for slot-PDSCH or subslot-PDSCH), then rounded to the closest valid transport block size in:

Table 7.1.7.2.1-1 when the transport block is mapped to one spatial layer,

The union of Table 7.1.7.2.1-1 and Table 7.1.7.2.2-1 when the transport block is mapped to two spatial layers, The union of Table 7.1.7.2.1-1 and Table 7.1.7.2.4-1 when the transport block is mapped to three spatial layers, The union of Table 7.1.7.2.1-1 and Table 7.1.7.2.5-1 when the transport block is mapped to four spatial layers.

If the scaled TBS is closest to two valid transport block sizes, it is rounded to the larger transport block size.

Although the above example is described for downlink sTTI channels, similar designs can be applied to uplink sTTI channels, and are within the scope of the present disclosure.

The selection of TBS tables may also depend on the scaled size, and additionally or optionally on the number of layers. As an illustrative example, TBS for downlink sTTI channels may be computed based on LTE legacy TBS tables, including Table 7.1.2.1.1 (baseline table), Table 7.1.7.2.2-1 (translation table for two layers), Table 7.1.7.2.4-1 (translation table for three layers), and Table 7.1.7.2.5-1 (translation table for four layers). For a downlink control information (DCI) format associated with downlink scheduling of sTTI channels, e.g., Format 7-1A/7-1B/7-1C/7-1D/7-1E/7-1F/7-1G, an initial size (or a derived transport block size by legacy TBS computation) may be scaled by scaling factor α (e.g., ½ for slot-based PDSCH, or ⅙ for subslot-based PDSCH), then rounded to the closest valid transport block size in one of the following ($N_{RB}^{DL}$ denotes the number of downlink resource blocks):

Table 7.1.7.2.1-1 when the transport block is mapped to one spatial layer,

Table 7.1.7.2.1-1 when the transport block is mapped to two spatial layers, and either $1 \leq N_{RB}^{DL} \leq 55$ or the scaled TBS is smaller than 3112; otherwise, Table 7.1.7.2.2-1 when the transport block is mapped to two spatial layers.

Table 7.1.7.2.1-1 when the transport block is mapped to three spatial layers, and either $1 \leq N_{RB}^{DL} \leq 36$ or the scaled TBS is smaller than 3112; otherwise, Table 7.1.7.2.4-1 when the transport block is mapped to three spatial layers.

Table 7.1.7.2.1-1 when the transport block is mapped to four spatial layers, and either $1 \leq N_{RB}^{DL} \leq 27$ or the scaled TBS is smaller than 3112; otherwise, Table 7.1.7.2.5-1 when the transport block is mapped to four spatial layers.

If two valid TBS values are the closest, the larger TBS value is selected.

As another illustrative example, TBS for uplink sTTI channels may be computed based on the LTE legacy tables. For a DCI format associated with uplink scheduling of sTTI channels, e.g., DCI format 7-0A/B, an initial size (or a derived transport block size by legacy TBS computation) may be scaled by scaling factor α (e.g., ½ for slot-based PUSCH, 1/12 for subslot-based PUSCH with one data symbol in the subslot, or ⅙ for subslot-based PUSCH with two data symbols in the subslot), then rounded to the closest valid transport block size in one of the following ($N_{RB}^{DL}$ denotes the number of uplink resource blocks):

Table 7.1.7.2.1-1 when the transport block is mapped to one spatial layer,

Table 7.1.7.2.1-1 when the transport block is mapped to two spatial layers, and either $1 \leq N_{RB}^{UL} \leq 55$ or the scaled TBS is smaller than 3112; otherwise, Table 7.1.7.2.2-1 when the transport block is mapped to two spatial layers.

Table 7.1.7.2.1-1 when the transport block is mapped to three spatial layers, and either $1 \leq N_{RB}^{UL} \leq 36$ or the scaled TBS is smaller than 3112; otherwise, Table 7.1.7.2.4-1 when the transport block is mapped to three spatial layers.

Table 7.1.7.2.1-1 when the transport block is mapped to four spatial layers, and either $1 \leq N_{RB}^{UL} \leq 27$ or the scaled TBS is smaller than 3112; otherwise, Table 7.1.7.2.5-1 when the transport block is mapped to four spatial layers.

In case two valid TBS values are the closest, the lager TBS value is selected.

At block 440, the scaled size may be rounded to a TBS value of the selected table. A set of TBS values of the selected table may be determined. The set may contain all or a subset of the TBS values of the selected table. In some examples, the set may be restricted to TBS values of the baseline table corresponding to a same TBS index. Such a restriction may help maintain roughly same level of resource utilization corresponding to the TBS index.

The rounding operation may be performed with respect to the determined set of TBS values. In one aspect, a TBS value from the set may be chosen that is closest to the scaled size among all TBS values from the set. The closest-value rounding may help reduce deviation between the scaled size and the TBS for the sTTI channel, thereby maintaining a proportional reduction of TBS represented by the scaling factor. In another aspect, a TBS value from the set may be chosen that is closest to the scaled size among all the TBS values that are smaller than or equal to the scaled size. The closest-smaller-value rounding may help ensure the chosen TBS value would not exceed the scaled size and hence avoid increasing coding rate due to rounding.

A tie may occur during the rounding; for example, two different TBS values may be equally close to the scaled size. An implementation may pick either one of the two TBS values as the rounded value. In some cases, the scaled size may be rounded to the larger of the two values when a tie occurs. For example, suppose a scaled size being 192 is equally closest to two different TBS values (176 and 208), that is, 192 is midpoint between 176 and 208, the scaled size may be rounded up to 208, the larger of the two TBS values (176 and 208).

Figure 5:
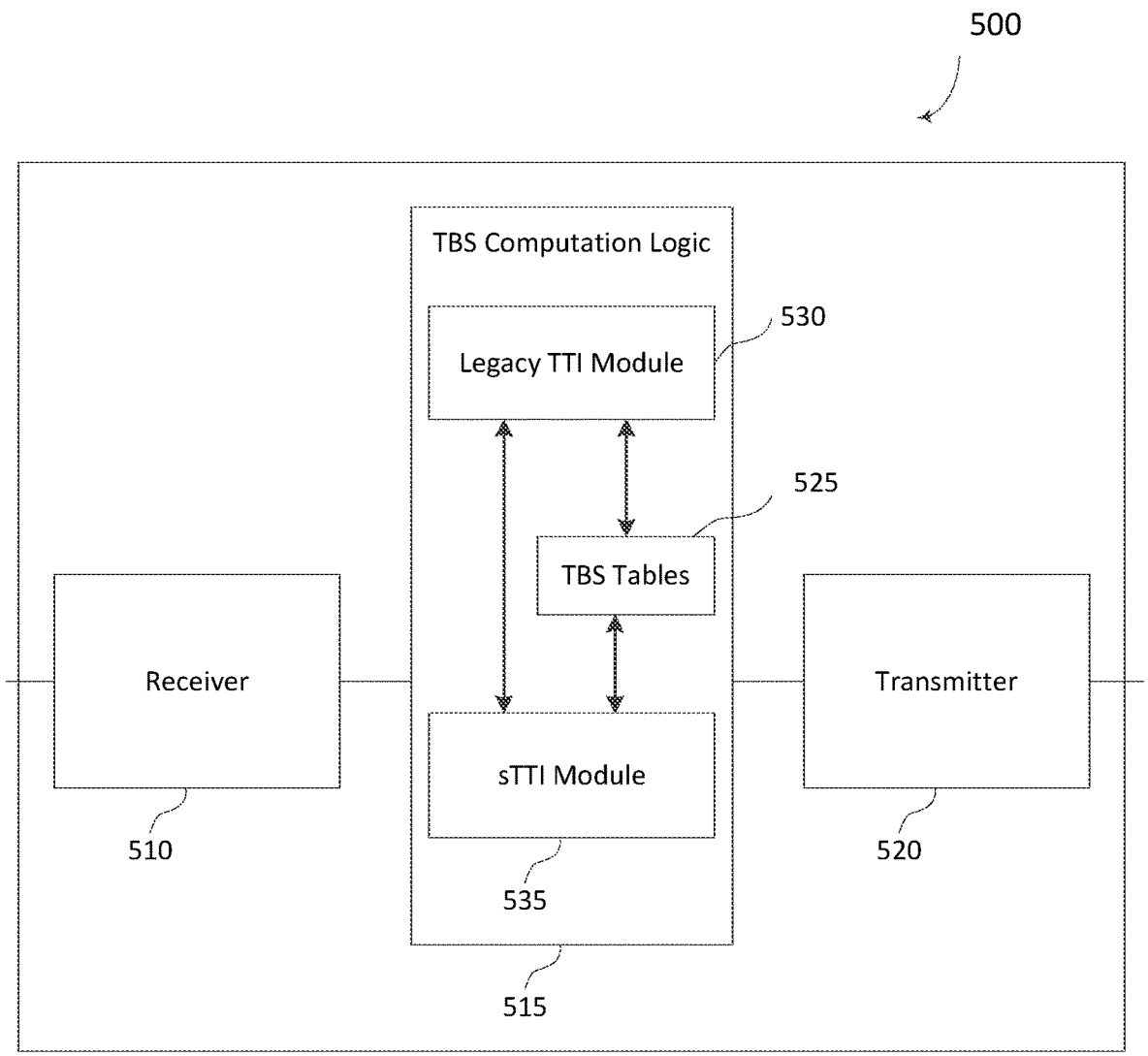
FIG. 5 illustrates an example of an apparatus that supports TBS computation for sTTI channels.

FIG. 5 illustrates an example of an apparatus 500 that supports TBS computation for sTTI channels. The apparatus 500 may include a receiver 510, a transmitter 520, and a TBS computation logic 515. The apparatus 500 may perform various aspects of the method 400 described with reference to FIG. 4. The apparatus 500 may be embodied by, or resides within, a UE 115 or a base station 105. For example, a UE 115 may compute TBS of a transport block for encoding sPUSCH or decoding sPDSCH. Correspondingly, a base station 105 may compute TBS of a transport block for decoding sPUSCH or encoding sPDSCH.

Receiver 510 may receive information such as packets, user data, or control information associated with various information channels. Information may be passed on to other components of the apparatus. The receiver 510 may utilize a single antenna or a set of multiple antennas. In some respects, receiver 510 may receive a transport block of an sTTI channel, such as sPDSCH by a UE 115 or sPUSCH by a base station 105. The transport block may be mapped to one or more layers.

Transmitter 520 may transmit signals generated by other components of the apparatus. In some examples, the transmitter 520 may be collocated with a receiver 510 in a transceiver module. The transmitter 520 may utilize a single antenna or a set of multiple antennas. In some respects, transmitter 520 may transmit a transport block of an sTTI channel, such as sPUSCH by a UE 115 or sPDSCH by a base station 105. The transport block may be mapped to one or more layers.

TBS computation logic 515 may be a baseband modem or an application processor or may illustrate aspects of a baseband or application processor. TBS computation logic 515 or at least some of its various sub-components may be implemented in hardware, software executed by a processor, firmware, or any combination thereof. If implemented in software executed by a processor, the functions of TBS computation logic 515 or at least some of its various sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure. Software may comprise codes or instructions stored in a memory or like medium that is connected or in communication with the process described above. The codes or instructions may cause the processor, the apparatus 500, or one or more components thereof to perform various functions described herein.

TBS computation logic 515 or at least some of its various sub-components may be physically located at various positions, including being distributed such that portions of functions are implemented at different physical locations by one or more physical devices. In some examples, TBS computation logic 515 or at least some of its various sub-components may be a separate and distinct component. In other examples, TBS computation logic 515 or at least some of its various sub-components may be combined with one or more other hardware components, including but not limited to an I/O component, a transceiver, a server, another computing device, one or more other components described in the present disclosure, or a combination thereof in accordance with various aspects of the present disclosure.

TBS computation logic 515 may include TBS tables 525, legacy TTI module 530, and sTTI module 535. Together these components may perform TBS computation for sTTI channels, e.g., implementing the method 400 described with reference to FIG. 4.

TBS tables 525 may include a baseline table and a translation table, e.g., as described with reference to FIG. 3. One or more entries of TBS tables 525 may be stored in memory accessible by the legacy TTI module 530 and the sTTI module 535. In some examples, table lookup operations may be implemented entirely or partially in hardware, firmware, or software.

Legacy TTI module 530 may be configured to compute TBS for legacy channels and to provide an initial size for an sTTI channel. The initial size may be determined through the baseline table or together with the translation table.

sTTI module 535 may be configured to scale the initial size by a factor associated with the sTTI channel, select either the baseline table, or a translation table, or a combination thereof, and/or round the scaled size to a TBS value of the selected table. In some examples, the sTTI module may also compute the legacy TBS to generate the baseline size using the TBS tables 525.

In one aspect, sTTI module 535 may be configured to select a union of the baseline table and a translation table based on a number of layers to which a transport block of the sTTI channel is mapped, for example, as described with reference to FIG. 4.

In another aspect, sTTI module 535 may be configured to compare the scaled size with a threshold and then select a table based on whether the scaled size is smaller than, or alternatively, greater than, the threshold. For example, the baseline table may be selected if the scaled size is smaller than the threshold, or the translation table is selected if the scaled size is greater than the threshold and if the translation table is used to determine the initial size.

The scaled size may be rounded with respect to all or a subset of the TBS values of the selected table. In one aspect, a set of TBS values may be determined. The scaled size may be rounded to a closest value in the set, or a closest smaller value in the set. The scaled size may be rounded to the larger of two different values that are equally closest to the scaled size.

Figure 6:
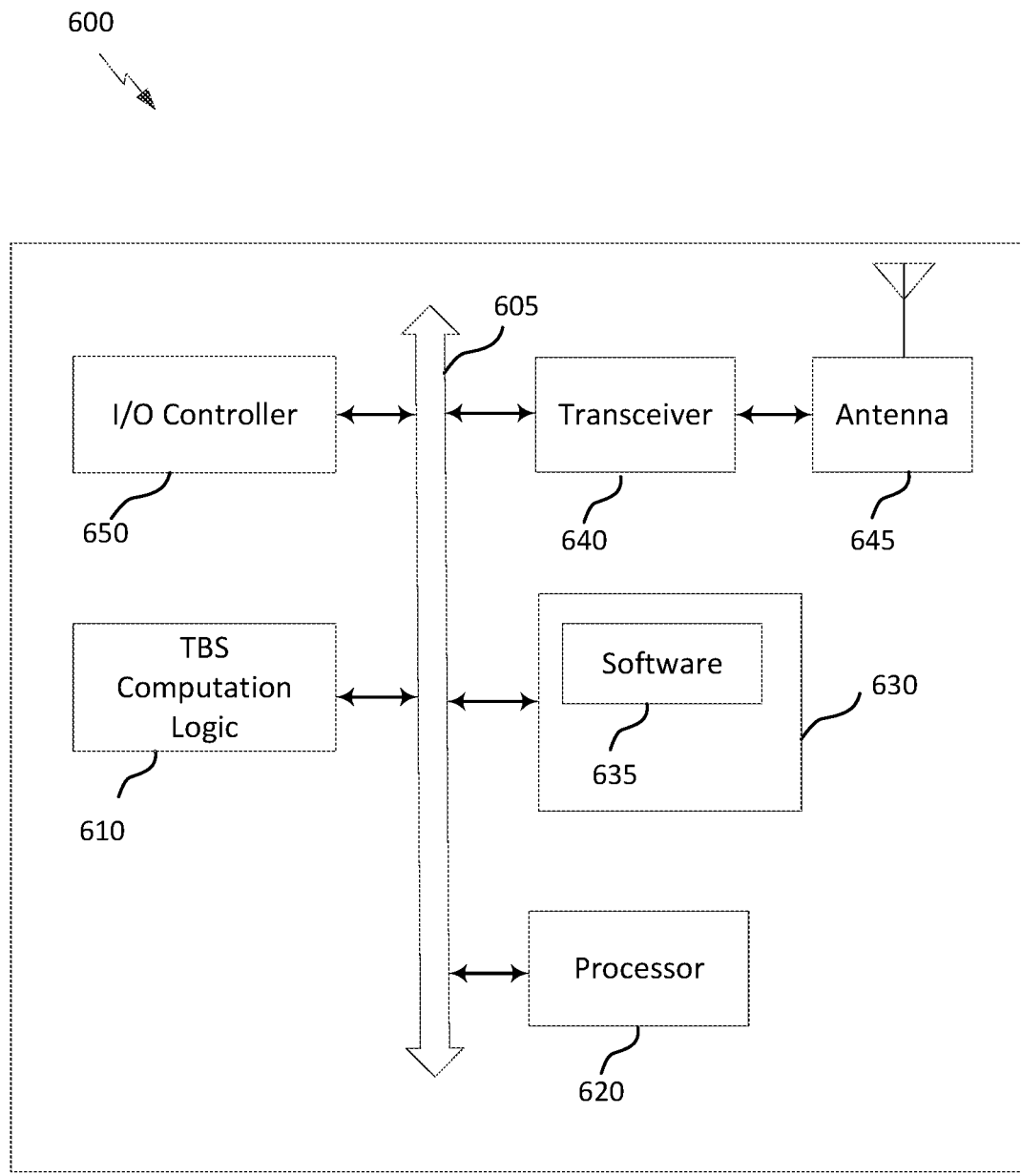
FIG. 6 illustrates an example of a device that supports TBS computation for sTTI channels.

FIG. 6 illustrates, as an example, a device 600 that supports TBS computation for sTTI channels in accordance with the present disclosure. The device 600 may be an example of a UE 115, or a base station 105, or components thereof, which may embody various aspects of the apparatus 500 described with reference to FIG. 5. The device 600 may comprise TBS Computation logic 610, processor 620, memory 630, software 635, transceiver 640, antenna 645, and I/O controller 650. These components may be coupled or in electronic communication via one or more buses (e.g., bus 605).

TBS Computation logic 610 may perform various functions supporting TBS computation for sTTI channels. For example, the TBS Computation logic 610 may be configured to determine an initial size using at least a baseline table; scale the initial size by a factor associated with an sTTI channel; select a table from either the baseline table, or a translation table, or a combination thereof; and/or round the scaled size to a TBS value of the selected table. In some examples, the TBS Computation logic 610 may implement the TBS computation logic 515 described with reference to FIG. 5. Generally speaking, the TBS Computation logic 610 may utilize processor 620 and memory 630 to execute its functionalities.

Processor 620 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 620 may be configured to operate a memory array using a memory controller. In other cases, a memory controller may be integrated into processor 620. Processor 620 may be configured to execute computer-readable instructions (e.g., software 635) stored in a memory (e.g., memory 630) to perform various functions.

Memory 630 may include random access memory (RAM) and/or read only memory (ROM). In some cases, the memory 630 may contain, among other things, a basic input/output system (BIOS) which may control basic hardware or software operation such as the interaction with peripheral components or devices. The memory 630 may store computer-readable, computer-executable software 635 including instructions that, when executed, cause the processor 620 (or the device 600 generally) to perform various functions described herein.

Software 635 may include codes implementing aspects of the present disclosure, e.g., described with reference to FIGS. 4 and 5. For example, the software 635 may include codes for determining an initial size using at least a baseline; codes for scaling the initial size by a factor associated with the sTTI channel; codes for selecting a table from either the baseline table, or a translation table, or a combination thereof; and/or codes for rounding the scaled size to a TBS value of the selected table. Software 635 may be stored in a non-transitory computer-readable medium such as system memory or other memory. In some cases, the software 635 may not be directly executable by the processor but may cause a computer (e.g., when compiled and executed) to perform functions described herein.

Transceiver 640 may communicate bi-directionally, via one or more antennas, wired, or wireless links as described above. For example, the transceiver 640 may represent a wireless transceiver and may communicate bi-directionally with another wireless transceiver. The transceiver 640 may also include a modem to modulate the packets and provide the modulated packets to the antennas for transmission, and to demodulate packets from signals received from the antennas. In some examples, the transceiver 640 may include both the receiver 510 and the transmitter 520 described with reference to FIG. 5.

In some cases, the wireless device may include a single antenna 645. However, in some cases the device may have more than one antenna 645, which may be capable of concurrently transmitting or receiving multiple wireless transmissions.

I/O controller 650 may manage input and output signals for the device 600. I/O controller 650 may also manage peripherals not integrated into the device 600. In some cases, I/O controller 650 may represent a physical connection or port to an external peripheral. In some cases, I/O controller 650 may utilize an operating system such as iOS®, ANDROID®, MS-DOS®, MS-WINDOWS®, OS/2®, UNIX®, LINUX®, or another known operating system. In other cases, I/O controller 650 may represent or interact with a modem, a keyboard, a mouse, a touchscreen, or other device. In some cases, I/O controller 650 may be implemented as part of a processor. In some cases, a user may interact with the device 600 via I/O controller 650 or via hardware components controlled by I/O controller 650.

Figure 7:
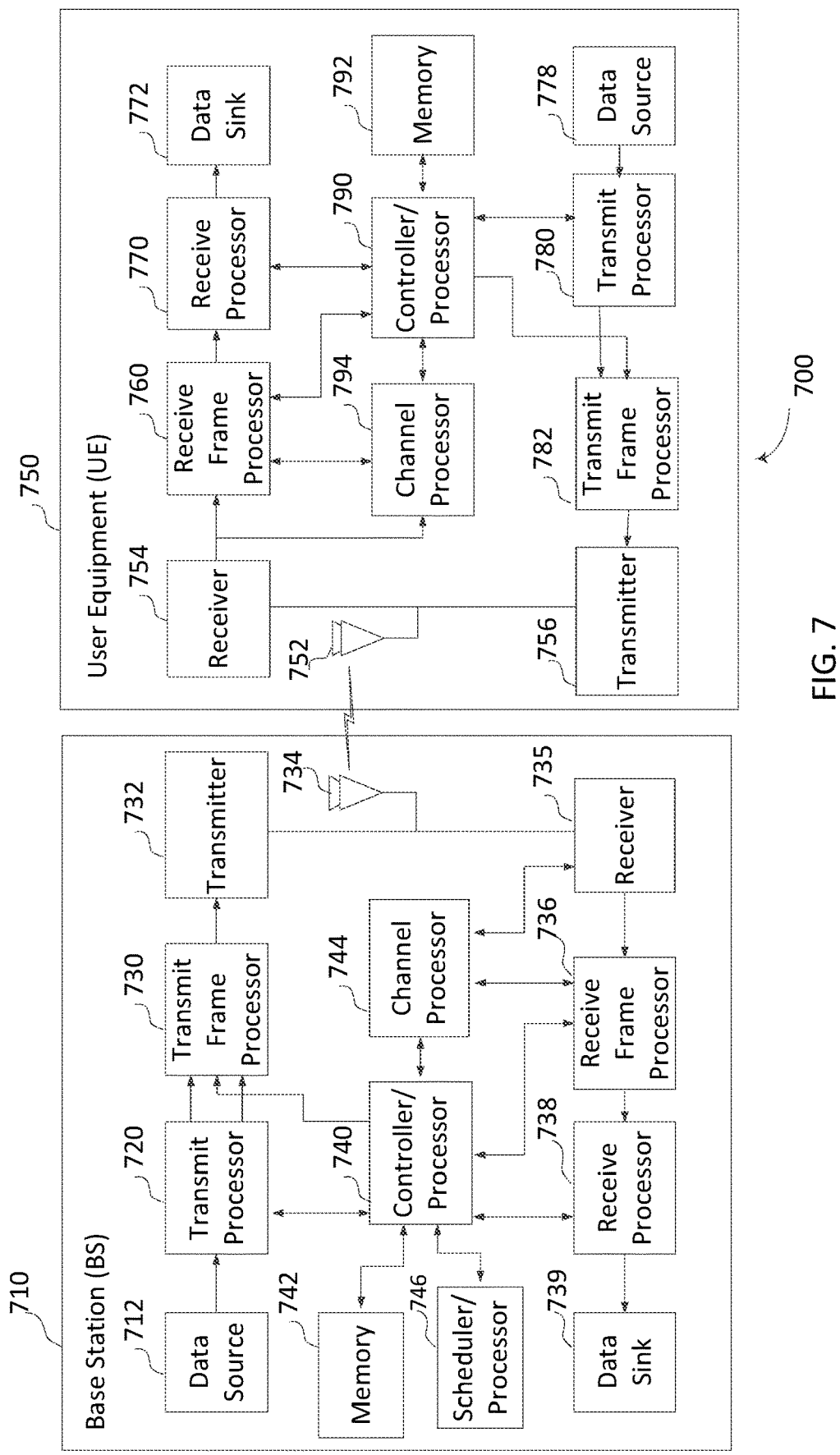
FIG. 7 illustrates an example of a base station in communication with a user equipment in a networking system that supports TBS computation for sTTI channels.

FIG. 7 illustrates an example of a base station 710 in communication with a user equipment 750 in a networking system 700 that supports TBS computation for sTTI channels. The base station 710 or the UE 750 may respectively be an example of the base station 105 or the UE 115 in FIG. 1.

In the downlink communication, a transmit processor 720 of the base station 710 may receive data from a data source 712 and control signals from a controller/processor 740. The transmit processor 720 provides various signal processing functions for the data and control signals, as well as reference signals (e.g., pilot signals). For example, the transmit processor 720 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like). The transmit processor 720 may generate transmit waveform symbols corresponding to a ratio access technology, such as spread spectrum or orthogonal frequency division modulation. Channel estimates from a channel processor 744 may be used by the controller/processor 740 to determine the coding, modulation, and/or waveform generation schemes for the transmit processor 720. These channel estimates may be derived from a reference signal transmitted by the UE 750 or from feedback from the UE 750. The symbols generated by the transmit processor 720 may be provided to a transmit frame processor 730 to create a frame structure. A frame may be further divided into a series of smaller units, such as subframes or slots. The frames are then provided to a transmitter 732, which may provide various signal conditioning functions including amplifying, filtering, and modulating the frames onto a carrier for downlink transmission over the wireless medium through one or more antennas 734. The antennas 734 may include beam steering bidirectional adaptive antenna arrays or other similar beam technologies.

At the UE 750, a receiver 754 receives the downlink transmission through one or more antennas 752 and processes the transmission to recover the information modulated onto the carrier. The information recovered by the receiver 754 is provided to a receive frame processor 760, which may parse each frame and provides information from the frames to a channel processor 794 and the data, control, and reference signals to a receive processor 770. The receive processor 770 then performs an inverse of the processing performed by the transmit processor 720 in the base station 710. More specifically, the receive processor 770 may process and demodulate the symbols based on the modulation scheme. These soft decisions may be based on channel estimates computed by the channel processor 794. The soft decisions are decoded and deinterleaved to recover the data or control signals. The CRC codes may be checked to determine whether the frames were successfully decoded. The data carried by the successfully decoded frames may be provided to a data sink 772, which represents applications running in the UE 750 and/or various user interfaces (e.g., a display). Control signals carried by successfully decoded frames are provided to a controller/processor 790. When data are unsuccessfully decoded by the receive processor 770, the controller/processor 790 may also use an acknowledgement (ACK) and/or negative acknowledgement (NACK) protocol to support retransmission requests for those data.

In the uplink, data from a data source 778 in the UE 750, and control signals from the controller/processor 790 are provided to a transmit processor 780. The data source 778 may represent applications running in the UE 750 and various user interfaces (e.g., keyboard). The transmit processor 780 provides various signal processing functions including CRC codes, coding and interleaving to facilitate FEC, mapping to signal constellations, and generating waveform symbols. Channel estimates, derived by the channel processor 794 from a reference signal transmitted by the base station 710 or from feedback by the base station 710, may be used to select the appropriate coding, modulation, waveform generation schemes. The symbols produced by the transmit processor 780 may be provided to a transmit frame processor 782 to create a frame structure. The generated frames are provided to a transmitter 756, which provides various signal conditioning functions including amplification, filtering, and modulating the frames onto a carrier for uplink transmission over the wireless medium through the antennas 652.

At the base station 710, a receiver 735 receives the uplink transmission through the antennas 734 and processes the transmission to recover the information modulated onto the carrier. The information recovered by the receiver 735 is provided to a receive frame processor 736, which parses each frame, and provides information from the frames to the channel processor 644 and the data, control, and reference signals to a receive processor 738. The receive processor 738 performs an inverse of the processing performed by the transmit processor 780 in the UE 750. The data and control signals carried by the successfully decoded frames may be provided to a data sink 639 and the controller/processor 740, respectively. If some of the data were successfully or unsuccessfully decoded by the receive processor, the controller/processor 740 may use an acknowledgement (ACK) or negative acknowledgement (NACK) protocol to support transmission or retransmission requests for those data.

The controller/processors 740 and 790 may be used to direct operations at the base station 710 and the UE 750, respectively. For example, the controller/processors 740 and 790 may provide various functions including timing, peripheral interfaces, voltage regulation, power management, and other control functions. The computer readable media of memories 742 and 792 may store data and software for the base station 710 and the UE 750, respectively. A scheduler/processor 746 at the base station 710 may be used to allocate resources to UEs and schedule downlink and uplink transmissions for the UEs.

The controller/processors 740 or 790 may compute TBS for a transport block of shorten TTI channels, e.g., as described in the method 400. It may provide configuration information for an individual transmit or receiver processor (e.g., the transmit processor 720, the receive processor 770) to compute the TBS. The computed TBS may be used to determine the payload size and may affect various processing (e.g., coding or decoding) in the transmit or receiver processor.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, the conjunction "or" shall generally be interpreted as "inclusive" unless the context indicates otherwise. For example, "A or B" would generally mean "either A, or B, or both" (but not necessarily "either A, or B, but not both"); in other words, the presented alternatives ("A" and "B") need not necessarily be mutually exclusive. Certain context, however, can indicate an "exclusive or," as in "whether A or not," for example.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include random access memory (RAM), read-only memory (ROM), electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of wireless communication, comprising:
   receiving a transport block on a shortened transmission time interval (sTTI) channel, wherein the transport block is mapped to a plurality of layers;
   determining a transport block size (TBS) of the transport block based at least on a baseline table and a translation table corresponding to the plurality of layers;
   scaling the TBS by a factor associated with the sTTI channel; and
   rounding the scaled TBS to a TBS value contained in a union of the baseline table and the translation table, the union being a combined dataset that contains at least some TBS values of the baseline table and at least some TBS values of the translation table.

2. The method of claim 1, wherein the translation table maps a baseline size from the baseline table to a TBS value.

3. The method of claim 1, wherein the combined dataset contains all TBS values of the baseline table or all TBS values of the translation table or both.

4. The method of claim 1, wherein the scaled TBS is rounded to a closest value in the union.

5. The method of claim 4, wherein, if two values of the union are equally closest to the scaled TBS, the scaled TBS is rounded to a larger one of the two values.

6. An apparatus of wireless communication, comprising:
   a receiver configured to receive a transport block on a shortened transmission time interval (sTTI) channel, wherein the transport block is mapped to a plurality of layers; and
   a processor, coupled to a memory, wherein the processor is configured to:
   determine a transport block size (TBS) of the transport block based at least on a baseline table and a translation table corresponding to the plurality of layers;
   scale the TBS by a factor associated with the sTTI channel; and
   round the scaled TBS to a TBS value contained in a union of the baseline table and the translation table, the union being a combined dataset that contains at least some TBS values of the baseline table and at least some TBS values of the translation table.

7. The apparatus of claim 6, wherein the translation table maps a baseline size from the baseline table to a TBS value.

8. The apparatus of claim 6, wherein the combined dataset contains all TBS values of the baseline table or all TBS values of the translation table or both.

9. The apparatus of claim 6, wherein the scaled TBS is rounded to a closest value in the union.

10. The apparatus of claim 9, wherein, if two values of the union are equally closest to the scaled TBS, the scaled TBS is rounded to a larger one of the two values.

11. An apparatus of wireless communication, comprising:
    means for receiving a transport block on a shortened transmission time interval (sTTI) channel, wherein the transport block is mapped to a plurality of layers;
    means for determining a transport block size (TBS) of the transport block based at least on a baseline table and a translation table corresponding to the plurality of layers;
    means for scaling the TBS by a factor associated with the sTTI channel; and
    rounding the scaled TBS to a TBS value contained in a union of the baseline table and the translation table, the union being a combined dataset that contains at least some TBS values of the baseline table and at least some TBS values of the translation table.

12. The apparatus of claim 11, wherein the translation table maps a baseline size from the baseline table to a TBS value.

13. The apparatus of claim 11, wherein the combined dataset contains all TBS values of the baseline table or all TBS values of the translation table or both.

14. The apparatus of claim 11, wherein the scaled TBS is rounded to a closest value in the union.

15. The apparatus of claim 14, wherein, if two values of the union are equally closest to the scaled TBS, the scaled TBS is rounded to a larger one of the two values.

16. A non-transitory computer-readable medium of wireless communication, the medium having instructions stored thereon which comprises codes executable to cause an apparatus to perform:
    receiving a transport block on a shortened transmission time interval (sTTI) channel, wherein the transport block is mapped to a plurality of layers;
    determining a transport block size (TBS) of the transport block based at least on a baseline table and a translation table corresponding to the plurality of layers;
    scaling the TBS by a factor associated with the sTTI channel; and
    rounding the scaled TBS to a TBS value contained in a union of the baseline table and the translation table, the union being a combined dataset that contains at least some TBS values of the baseline table and at least some TBS values of the translation table.

17. The non-transitory computer-readable medium of claim 16, wherein the translation table maps a baseline size from the baseline table to a TBS value.

18. The non-transitory computer-readable medium of claim 16, wherein the scaled TBS is rounded to a closest value in the union.

19. The non-transitory computer-readable medium of claim 18, wherein, if two values of the union are equally closest to the scaled TBS, the scaled TBS is rounded to a larger one of the two values.

* * * * *